(12) United States Patent
Wang et al.

(10) Patent No.: US 9,309,674 B2
(45) Date of Patent: Apr. 12, 2016

(54) NON-BLACK RUBBER MEMBRANES

(71) Applicant: FIRESTONE BUILDING PRODUCTS CO, LLC, Indianapolis, IN (US)

(72) Inventors: Hao Wang, Carmel, IN (US); James A. Davis, Summerfield, FL (US); Willam F. Barham, Prescott, AZ (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 0 days.

(21) Appl. No.: 14/446,213

(22) Filed: Jul. 29, 2014

(65) Prior Publication Data

US 2015/0038031 A1 Feb. 5, 2015

Related U.S. Application Data

(62) Division of application No. 13/287,417, filed on Nov. 2, 2011, now Pat. No. 8,791,193, which is a division of application No. 13/389,145, filed on Feb. 19, 2009, now Pat. No. 8,367,760.

(60) Provisional application No. 61/029,777, filed on Feb. 19, 2008.

(51) Int. Cl.
| | |
|---|---|
| *C08K 3/34* | (2006.01) |
| *E04D 5/10* | (2006.01) |
| *B32B 5/02* | (2006.01) |
| *B32B 25/02* | (2006.01) |
| *B32B 25/04* | (2006.01) |
| *B32B 25/10* | (2006.01) |
| *B32B 25/14* | (2006.01) |
| *B29C 43/24* | (2006.01) |
| *B29C 43/30* | (2006.01) |
| *B29C 65/70* | (2006.01) |
| *C08K 3/36* | (2006.01) |
| *C08K 5/548* | (2006.01) |
| *E04D 5/06* | (2006.01) |
| *B29D 7/01* | (2006.01) |
| *B29K 9/00* | (2006.01) |
| *B29K 483/00* | (2006.01) |
| *B29K 505/00* | (2006.01) |
| *B29K 509/00* | (2006.01) |

(52) U.S. Cl.
CPC . *E04D 5/10* (2013.01); *B29C 43/24* (2013.01); *B29C 43/305* (2013.01); *B29C 65/70* (2013.01); *B32B 5/028* (2013.01); *B32B 25/02* (2013.01); *B32B 25/042* (2013.01); *B32B 25/10* (2013.01); *B32B 25/14* (2013.01); *C08K 3/36* (2013.01); *C08K 5/548* (2013.01); *E04D 5/06* (2013.01); *B29D 7/01* (2013.01); *B29K 2009/00* (2013.01); *B29K 2483/00* (2013.01); *B29K 2505/00* (2013.01); *B29K 2509/00* (2013.01); *B32B 2264/102* (2013.01); *B32B 2419/06* (2013.01); *Y10T 428/31667* (2015.04); *Y10T 442/10* (2015.04)

(58) Field of Classification Search
CPC .............. E04D 5/10; E04D 5/06; C08K 3/36; C08K 5/548; B29C 43/24; B29C 43/305; B29C 65/70; B29D 7/01
USPC ........................................................ 524/492
See application file for complete search history.

(56) References Cited

U.S. PATENT DOCUMENTS

| | | | |
|---|---|---|---|
| 2,619,481 | A | 11/1952 | Baldwin et al. |
| 3,280,082 | A | 10/1966 | Natta et al. |
| 3,842,111 | A | 10/1974 | Meyer-Simon et al. |
| 3,873,489 | A | 3/1975 | Thurn et al. |
| 3,978,103 | A | 8/1976 | Meyer-Simon et al. |
| 3,997,581 | A | 12/1976 | Pletka et al. |
| 4,002,594 | A | 1/1977 | Fetterman |
| 5,093,206 | A | 3/1992 | Schoenbeck |
| 5,468,550 | A | 11/1995 | Davis et al. |
| 5,580,919 | A | 12/1996 | Agostini et al. |
| 5,583,245 | A | 12/1996 | Parker et al. |
| 5,663,396 | A | 9/1997 | Musleve et al. |
| 5,674,932 | A | 10/1997 | Agostini et al. |
| 5,684,171 | A | 11/1997 | Wideman et al. |
| 5,684,172 | A | 11/1997 | Wideman et al. |
| 5,696,197 | A | 12/1997 | Smith et al. |
| 5,700,538 | A | 12/1997 | Davis et al. |
| 5,703,154 | A | 12/1997 | Davis et al. |
| 5,804,661 | A | 9/1998 | Davis et al. |
| 5,854,327 | A * | 12/1998 | Davis et al. ................... 524/445 |
| 6,579,949 | B1 | 6/2003 | Hergenrother et al. |
| 6,608,145 | B1 * | 8/2003 | Lin et al. ..................... 525/332.6 |
| 6,615,892 | B2 | 9/2003 | Hubbard et al. |
| 6,632,509 | B1 | 10/2003 | Davis et al. |
| 6,667,362 | B2 | 12/2003 | Robert et al. |
| 6,683,135 | B2 * | 1/2004 | Cruse et al. ................... 525/100 |
| 2003/0119966 | A1 | 6/2003 | Fusamae et al. |

* cited by examiner

*Primary Examiner* — Hui Chin
(74) *Attorney, Agent, or Firm* — Tom Kingsbury; Arthur M. Reginelli

(57) ABSTRACT

A roofing membrane comprising an olefinic rubber; and from about 20 to about 250 parts by weight of a silica filler per 100 parts by weight rubber; wherein the silica filler is chemically coupled to the olefinic rubber; and wherein the roofing membrane is non-black.

8 Claims, No Drawings

NON-BLACK RUBBER MEMBRANES

This application is a divisional application of U.S. Non-Provisional application Ser. No. 13/287,417, filed Nov. 2, 2011, which is a divisional application of U.S. Ser. No. 12/389,145, filed on Feb. 19, 2009, which issued on Feb. 5, 2013 as U.S. Pat. No. 8,367,760, which claims the benefit of U.S. Provisional Application Ser. No. 61/029,777, filed on Feb. 19, 2008, all of which are incorporated herein by reference.

FIELD OF THE INVENTION

One or more embodiments of the present invention relate generally to non-black rubber sheeting materials. Certain embodiments relate to silica-filled olefinic rubber membranes, including EPDM membranes, for use in roofing applications.

BACKGROUND OF THE INVENTION

Ethylene-propylene-diene terpolymer (EPDM) is extensively used in a variety of applications. For example, it is particularly useful as a polymeric sheeting material, which, because of its excellent physical properties, flexibility, weathering resistance, low temperature properties and heat aging resistance, has gained acceptance as a roofing membrane for covering industrial and commercial roofs. These roofing membranes are typically applied to the roof surface in a vulcanized or cured state and serve as an effective barrier to prevent the penetration of moisture to the covered roof.

Traditional EPDM roofing membranes are generally black or very dark in color, and are typically prepared by compounding the base polymer of EPDM with one or more carbon black fillers, processing oil, and other desired ingredients such as plasticizers, antidegradants, adhesive-enhancing promoters, etc., in a suitable mixer, and calendering the resulting compound into the desired thickness. The roofing membrane may also be cured by vulcanizing the resultant sheet in the presence of one or more vulcanizing agents and/or compatible vulcanizing accelerators. Vulcanizing agents such as sulfur or sulfur-donating compounds such as mercaptans are typically used, although vulcanization and curing may be done using other agents or in the presence of other compounds.

While black or dark-colored EPDM membranes have been used for decades as commercial single-ply roofing membranes, such membranes are known to absorb sunlight and become hot. This has lead to various environmental and energy concerns. In recent years, great efforts have been made toward producing white and/or other non-black EPDM membranes that are more environmentally friendly and more energy efficient. Various mineral fillers such as clay, talc, silicas, mica, calcium carbonate, and the like, in various combinations, have been added to various roofing membrane formulations to improve energy absorption characteristics.

One particular type of non-black mineral filler that has been used in combination with various clay fillers in non-black EPDM membranes includes silicas. It is known that silica, when used in combination with various clay mineral fillers as an EPDM membrane, can improve certain physical properties such as abrasion resistance and tear resistance. However, silicas, by themselves, do not provide effective reinforcement of the rubber membranes such as carbon black does in black EPDM membranes. Thus, there remains a need for a silica-filled olefinic membrane with improved performance and processing properties beyond those already known.

SUMMARY OF THE INVENTION

One or more embodiments of the present invention provide a roofing membrane comprising an olefinic rubber and from about 20 to about 250 parts by weight of a silica filler per 100 parts by weight rubber, wherein the silica filler is chemically coupled to the olefinic rubber and wherein the roofing membrane is non-black.

One or more embodiments of the present invention further provide a method for improving the reinforcement properties of a non-black silica-filled olefinic roofing membrane comprising providing a mixture of an olefinic rubber and from about 20 to about 250 parts by weight of a silica filler per 100 parts by weight rubber, adding a silane coupling agent compatible with the olefinic rubber and the silica filler such that the olefinic rubber is chemically linked to the silica filler.

One or more embodiments of the present invention further provide a vulcanizable composition suitable for use in the production of a roofing membrane, the composition comprising the reaction product of an olefinic rubber from about 20 to about 250 parts by weight of a silica filler per 100 parts by weight rubber; and from about 0.1 to about 5 parts by weight of a silane coupling agent per 100 parts by weight rubber, wherein the silane coupling agent is compatible with both the olefinic rubber and the silica filler, such that the olefinic rubber is chemically coupled to the silica filler.

One or more embodiments of the present invention further provide a method for the production of a roofing membrane comprising mixing a olefinic rubber, a silica filler, and a silane coupling agent in a masterbatch, wherein the silica filler reacts with the silane coupling agent to form an uncured compound, calendering the uncured compound into one or more layers to form a sheet, and curing the calendered uncured compound such that the olefinic rubber is chemically coupled to the silica filler.

One or more embodiments of the present invention still further provide a laminate membrane comprising a first layer including a cured elastomeric olefinic copolymer and silica, where at least a portion of the silica is coupled to the elastomeric olefinic copolymer a second layer including cured elastomeric olefinic copolymer and carbon black, and optionally a scrim fabric.

DETAILED DESCRIPTION OF ILLUSTRATIVE EMBODIMENTS

One or more embodiments of the present invention are directed toward non-black roofing membranes that include cured rubber (e.g. EPDM) and non-black reinforcing filler (e.g. silica), wherein at least a portion of the rubber has been chemically coupled to at least a portion of the non-black reinforcing filler. In one or more embodiments, a silane coupling agent is employed to effect the coupling between the non-black reinforcing filler and the rubber. Thus, certain embodiments include a vulcanizable composition including not only a vulcanizable polymer and a non-black reinforcing filler, but also a coupling agent. An uncured sheet can be formed from this composition and cured such that, upon curing, the rubber is chemically coupled to the filler. In one or more embodiments, a silane coupling agent acts to link the rubber and a silica filler together in such a way as to produce cured composition characterized by advantageous physical properties. Also, in one or more embodiments, the introduction of a silane coupling agent provides technological advantage during processing of the vulcanizable composition employed in making the membranes.

In one or more embodiments, the membranes of the present invention are monolithic membranes. These membranes include those where the composition of the membrane (excluding any optional scrim) is homogeneous throughout the thickness of the membrane. In one or more embodiments, these monolithic membranes derive from a single calendered sheet. In one or more embodiments, these monolithic membranes may optionally include a scrim such as a reinforcing scrim. Membranes including a scrim fabric may be referred to as composite membranes.

In other embodiments, the membranes of the present invention are laminate membranes including at least non-black layer prepared from a non-black rubber formulation as described herein. In one or more embodiments, these laminate membranes include at least one layer including carbon black as a filler. In certain embodiments, these bilaminate membranes may be composites and include scrim.

In either event, the membranes of the present invention include at least one non-black polymeric layer that derives from the non-black vulcanizable compositions described herein.

The membranes of the present invention (or at least one non-black layer of the membranes of the present invention) are prepared from non-black vulcanizable compositions of matter that include a rubber, a non-black reinforcing filler, a curative, and a coupling agent. They may be simply referred to as vulcanizable compositions. Optional ingredients may also be added.

In one or more embodiments, useful rubber includes elastomeric olefinic copolymer rubber, which may simply be referred to as olefinic rubber, olefinic copolymer, or simply rubber. In one or more embodiments, useful olefinic rubber includes that rubber that is capable of being cured or crosslinked with sulfur or sulfur-based cure systems.

In one or more embodiments, the olefinic copolymer is a terpolyer that includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082, which is incorporated herein by reference. For purposes of this specification, elastomeric olefinic copolymers may be referred to as elastomeric olefinic terpolymers, terpolymers, or simply EPDM.

In one or more embodiments, the terpolymer may include at least 55 weight percent, in other embodiments at least 60 weight percent, in other embodiments at least 62 weight percent, and in other embodiments at least 64 weight percent mer units deriving from ethylene; in these or other embodiments, the elastomeric terpolymer may include less than about 73 weight percent, in other embodiments less than about 70 weight percent, and in other embodiments less than about 69 weight percent, mer units deriving from ethylene.

In one or more embodiments, the elastomeric terpolymer may include at least 1 percent by weight, in other embodiments at least 1.5 percent by weight, in other embodiments at least 2 weight percent, in other embodiments at least 2.4 weight percent, mer units deriving from diene monomer; in these or other embodiments, the elastomeric terpolymer may include less than about 4 weight percent, and in other embodiments less than about 3.2 weight percent, mer units deriving from diene monomer. In one or more embodiments, the balance of the mer units derive from propylene or other α-olefins. In particular embodiments of the present invention, the use of a silane coupling agent may advantageously provide for the use of terpolymer rubber having relatively low amounts of diene; for example, terpolymer rubber including from about 1 to about 2 percent, or in other embodiments from about 1.3 to about 1.7 percent, mer units deriving from diene monomer may be used.

In one or more embodiments, the useful elastomeric olefinic terpolymer (EPDM) may be characterized by a Mooney Viscosity ($ML_{1+4}$@125° C.) of about 35 to about 70, and in other embodiments from about 50 to about 70.

Useful EPDM varieties are commercially available. Examples include Royalene® 512, which has a Mooney Viscosity ($ML_{1+4}$@125° C.) range of 52 to 67, and an ethylene to propylene ratio of 68/32. Other example EPDMs suitable for the present invention include, but are not limited to, Royalene® 512 and Royalene® 502.

In one or more embodiments, the EPDM membrane is cured or crosslinked. In one or more embodiments, the EPDM membrane is cured at a temperature of about 160° C. In another embodiment, the EPDM membrane may be cured in an autoclave in the presence of steam and pressure.

EPDM can be cured by using numerous techniques such as those that employ sulfur cure systems, peroxide cure systems, and quinone-type cure systems. The sulfur cure systems may be employed in combination with vulcanizing accelerators. Useful accelerators include thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazolesulfenamide, N-tert-butyl-2-benzothiazole sulfenamide (TBBS) (available as Delac® NS from Chemtura, Middlebury, Conn.) and the like; other thiazole accelerators such as 2-mercaptobenzothiazole (MBT), benzothiazyl disulfide (MBTS), N,N-diphenylguanidine, N,N-di-(2-methylphenyl)-guanidine, 2-(morpholinodithio)benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, sodium butyldithiocarbamate, zinc diethyldithiocarbamate, zinc dimethyldithiocarbamate, zinc dibutyldithiocarbamate (ZDBDC) and mixtures thereof. Sulfur donor-type accelerators (e.g. di-morpholino disulfide and alkyl phenol disulfide) may be used in place of elemental sulfur or in conjunction with elemental sulfur if desired.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoye peroxide, phenylacetyl peroxide, and mixtures thereof.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and mixtures thereof.

Examples of polysulfide activators for the quinone-type co-curing agents include calcium polysulfide, sodium polysulfide, as well as organic polysulfides having the general formula R—$(S)_x$—R, wherein R is a hydrocarbon group and x is a number from 2-4. Examples of organic polysulfides are disclosed in U.S. Pat. No. 2,619,481, which is incorporated herein by reference.

Conventional radiation equipment and techniques can also be employed in the practice of this invention. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition, they may also function to reduce the dosage of ionizing radiation needed to obtain the desired level of crosslinking.

Sulfur and sulfur-containing cure systems may be used, and may also be used with an accelerator. Suitable amounts of sulfur can be readily determined by those skilled in the art. In one or more embodiments roughly about 1 part by weight (pbw) sulfur per 100 parts by weight rubber (phr) may be used. The amount of accelerator can also be readily determined by those skilled in the art.

In one or more embodiments, non-black reinforcing fillers include mineral fillers that are characterized by a particle size (average diameter or cross-section) of less than 10 microns, in other embodiments less than 5 microns, and in other embodiments less than 1 micron. In these or other embodiments, these fillers are characterized by a particle size of at least 10 nanometers, in other embodiments at least 50 nanometers, and in other embodiments at least 100 nanometers.

In one or more embodiments, the non-black reinforcing fillers include a moiety or group that is capable of reacting with a silane moiety or groups of a silane coupling agent. In one or more embodiments, the non-black reinforcing filler includes one or more hydroxyl groups on the surface of the filler particle.

In one or more embodiments, a single type of reinforcing non-black filler may be employed, and in other embodiments two or more reinforcing non-black fillers may be used in conjunction. In one or more embodiments, one or more reinforcing fillers may be employed in conjunction with one or more non-reinforcing fillers. The non-reinforcing fillers may include non-black mineral fillers that do not include groups or moieties that will react with a silane and/or are larger in particle size than the reinforcing fillers.

In one or more embodiments, silica is employed as the non-black reinforcing filler. In one or more embodiments, silica filler is employed alone. In other embodiments, silica filler is included with $TiO_2$. In other embodiments, silica filler is included along with other mineral fillers that do not substantially reinforce the composition.

In one or more embodiments, useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed.

Commercially available forms are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 $m^2/g$, tapped density of 230 g/liter, pH (5% in water suspension) of 7, SiO2 content of 98%, Na2SO4 content of 2%, and Al2O3 content of 0.2%. In at least one embodiment, silica filler may be used without any other mineral fillers.

In one or more embodiments, other non-black reinforcing fillers include magnesium hydroxide. In yet other embodiments, non-black reinforcing fillers include aluminum trihydrate.

In one or more embodiments, titanium dioxides may be optionally included. Useful titanium dioxides include rutile forms of titanium dioxide. One useful commercial product is TiPure® R-960 (DuPont), which is a fine, white powder having a specific gravity of 3.90. Another suitable titanium dioxide product is CR-800 (TRONOX), which is believed to be characterized by a titanium dioxide content of about 96% and a specific gravity of about 3.8 to about 4.1.

In one or more embodiments, talc may optionally be included. Useful talc include hydrated magnesium silicate. In one or more embodiments, talc can be represented by the formulae $Mg_3Si_4O_{10}(OH)_2$ or $3MgO.4SiO_2.H_2O$. Exemplary forms of talc include talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. A representative commercially available talc is Talc 9107, which is available from Polar Minerals (Mt. Vernon, Ind.), which is non-abrasive, chemically inert, has a specific gravity of about 2.8, a pH of about 8.7, a refractive index of about 1.57 at 23° C., and a moisture content of less than about 0.3 weight percent.

Another suitable talc is Mistron® Vapor Talc, which is available from Luzenac America (Centennial, Colo.). Mistron® Vapor Talc is a soft, ultra-fine, white platy powder having a specific gravity of 2.75, a median particle size of 1.7 microns, an average surface area of 18 $m^2/g$, and a bulk density (tapped) of 20 $lbs/ft^3$. Other talcs commercially available from Luzenac America (Centennial, Colo.), include Vertal MB, and Silverline 002. In one embodiment, talc is characterized as a platy, chemically inert filler having a specific gravity of from about 2.6 to about 2.8, a pH of about 7, and a moisture content of less than about 0.5 weight percent.

While, in one or more embodiments, clays may be used, in other embodiments, the present invention is devoid of the use of clays of all types. Where clays are used, useful clays include hydrated aluminum silicates. In one or more embodiments, useful clays can be represented by the formula $Al_2O_3SiO_2.XH_2O$. Exemplary forms of clay include kaolinite, montmorillonite, atapulgite, illite, bentonite, halloysite, and mixtures thereof. In one embodiment, the clay is represented by the formula $Al_2O_3SiO_2.3H_2O$. In another embodiment, the clay is represented by the formula $Al_2O_3SiO_2.2H_2O$. In a preferred embodiment, the clay has a pH of about 7.0.

In one or more embodiments, various forms or grades of clays may be employed. Exemplary forms or grades of clay include air-floated clays, water-washed clays, calcined clays, and chemically modified (surface treated) clays. In other embodiments, untreated clays may be used.

Air-floated clays include hard and soft clays. In one or more embodiments, hard clays include those characterized as having a lower median particle size distribution, and higher surface area than soft clays. In one or more embodiments, soft clays include those characterized by having a higher median particle size distribution and lower surface area than hard clays. Hard and soft clays are disclosed in U.S. Pat. Nos. 5,468,550, and 5,854,327, which are incorporated herein by reference.

In one embodiment, the air-floated clays used have a pH of from about 4.0 to about 8.0, and in another embodiment, the pH is about neutral. Useful airfloated clays have an average particle size of less than about 2 microns. Typical airfloated clays have a specific gravity of around 2.6 g/cc.

Airfloated clays, both hard and soft, are available through various sources. Available from Unimin Corporation (New Canaan, Conn.) is Snobrite™ AF, which is an airfloated hard clay having a pH of about 5.5 to 7.5, a median particle size of about 1 micron, and a specific gravity of about 2.6 g/cc. Available from Kentucky-Tennessee Clay Company (Mayfield, Ky.) is Paragon, which has a pH of about 4.5 to 5.5, a median particle size of about 1 micron, and a specific gravity of about 2.6 g/cc, and Tennessee Clay No. 6, an airfloated hard clay with a pH of from about 5.5 to 6.5, a median particle size of about 1.0 micron, and a specific gravity of about 2.6. A soft airfloated clay from Unimin Corporation (New Canaan, Conn.) is Hi White R®, which has a pH of about 6.25, a median particle size of less than about 1 micron, and a specific gravity of about 2.6 g/cc, Alumex, and Suprex, all airfloated soft clays. Available from J.M. Huber Corporation (Atlanta, Ga.) is Barden R, and LGB, which are both airfloated hard clays, and K-78, an airfloated soft clay. Available from R.T. Vanderbilt Company (Norwalk, Conn.) is McNamee Clay, which is an airfloated soft clay having a pH of about 5.0 to 7.5, a median particle size of about 1 micron and a specific gravity of about 2.6 g/cc.

Water washed clays include those clays that are more closely controlled for particle size by the water fractionation process. This process permits the production of clays within controlled particle size ranges. In one embodiment, the average particle size of the clay is less than about 2 microns in diameter. In another embodiment, the pH of the clay is about 7. Available from J.M. Huber Corporation (Atlanta, Ga.) are water washed clays such as Polyfil® DL, Polyfil® F, Polyfil® FB, Polyfil® HG-90, Polyfil® K and Polyfil® XB. In one embodiment, a water washed kaolin clay includes hydrated aluminum silicate, which has a pH of from about 6 to about 7.5, and a specific gravity of about 2.6 g/cc.

Calcined clays include those that result from the removal of water contained in clays (clays typically contain about 14 percent water) by calcination. The amount of bound water removed determines the degree of calcination. In one embodiment, the average particle size of the clay is less than about 2 microns in diameter. In another embodiment, the pH of the clay is about 7. Available from J.M. Huber Corporation (Atlanta, Ga.) are calcined clays such as Polyfil® 40, Polyfil® 70, and Polyfil® 80.

Chemically modified (surface treated) clays include those that have cross-linking ability, which can be imparted to the clay by modifying the surface of individual particles with a polyfunctional silane coupling agent. In one embodiment, the average particle size of the clay is less than about 2 microns in diameter. In another embodiment, the pH of the clay is about 7. Available from J.M. Huber Corporation (Atlanta, Ga.) are Nucap® 100 G, Nucap® 200, Nucap® 190, Nucap® 290, Nulok® 321, Nulok® 390, and Polyfil® 368.

In one or more embodiments, coupling agents include those compounds that can chemically link the rubber to the non-black reinforcing filler. In one or more embodiments, the coupling agents include a silane group or moiety that is believed to react with a hydroxyl group on the non-black reinforcing filler and chemically bond thereto. Inasmuch as silica includes hydroxyl groups that will react with silane groups on the coupling agent, the coupling agents may be referred to as silica coupling. In other embodiments, the coupling agents may be referred to as silane coupling agents. Useful silica coupling agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172, 5,696,197, 6,608,145, and 6,667,362, the disclosures of which are incorporated herein by reference.

In one or more embodiments, the silane coupling agent may be an organosilane. In one or more embodiments, the silane coupling agent may be a hindered silane. In yet one or more other embodiments, the silane coupling agent may be a mercapto silane. In still one or more other embodiments, the silane coupling agent may be is a bi-functional sulfur-silane having a blocked mercapto group. In still one or more other embodiments, the silane coupling agents may include an alkoxysilyl or silyl halide functional group.

In one or more embodiments, the use of hindered silane coupling agents provides for several advantages. For example, the processing properties and the physical properties of the resultant compound have, in certain embodiments, proven to be advantageous. For example, silica-filled EPDM membranes have been shown to have increased physical properties, such as higher modulus, higher tensile strength and improved tear resistance, as compared to silica-filled EPDM membranes prepared without a silane coupling agent. Furthermore, processing properties, such as increased scorch safety and decreased compound viscosity (i.e., softer compounds requiring less energy to break down stocks before processing or calendering) have been found. Also, the reduction in viscosity of the membrane due to the use of the silane coupling agent allows for higher loading of fillers and for higher molecular weight polymers to be used without sacrificing compound processing properties. Finally, it has been found that membranes having employed the silane coupling agent in the production of the mineral (silica)-filled EPDM compounds require less time to cure to have equal or better physical properties.

Examples of silane coupling agents include bis(trialkoxysilylorgano)polysulfides, mercaptosilanes, and blocked mercaptosilanes. Bis(trialkoxysilylorgano)polysulfides include bis(trialkoxysilylorgano)disulfides and bis(trialkoxysilylorgano)tetrasulfides. Examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 3,3'-bis(triisopropoxysilylpropyl)disulfide, 3,3'-bis(dimethoxyphenylsilyl-2-methylpropyl)disulfide, and mixtures thereof.

Examples of bis(trialkoxysilylorgano)tetrasulfide silica coupling agents include bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N- dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69 by Degussa.

Mercaptosilanes include compounds represented by the formula

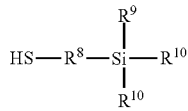

where $R^8$ is a divalent organic group or a bond, $R^9$ is a halogen atom or an alkoxy group, and each $R^{10}$ is independently a halogen, an alkoxy group, or a monovalent organic group. In one embodiment, at least one of $R^9$ and $R^{10}$ is an alkoxy group, and in another embodiment, $R^9$ and each $R^{10}$ is an alkoxy group. In certain embodiments, the alkoxy group has from 1 to 4 carbon atoms. In certain embodiments, the divalent organic group is an alkylene group containing from 1 to about 4 carbon atoms. In certain embodiments, the halogen is chlorine, bromine, iodine, or fluorine, and in one embodiment, the halogen is chlorine.

Examples of mercaptosilanes include 1-mercaptomethyl-triethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

In one or more embodiments, mercaptosilanes also include blocked mercaptosilane compounds. In one or more embodiments, these blocked compounds can be used in conjunction with a deblocking agent. Advantageously, blocked mercaptosilanes do not provide an unpleasant odor, unlike the mercaptosilanes above. Blocked mercaptosilanes may include sulfur-containing silanes where a sulfur atom is bonded to a silyl group, perhaps through a linking moiety, and the sulfur atom is also bonded to a blocking group. In one or more embodiments, during processing, the blocking group can be removed to form a mercaptosilane that is capable of acting as a coupling agent. An example of a simple blocked mercaptosilane can be represented by the formula

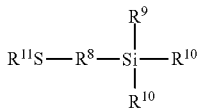

where $R^8$, $R^9$ and $R^{10}$ are as described above, and $R^{11}$ is a blocking group that will come off during processing leaving the S free to react with the polymer. In one embodiment, $R^{11}$ contains an unsaturated heteroatom or carbon chemically bound directly to S via a single bond, and is optionally substituted with one or more carboxylate ester or carboxylic acid functional groups. In another embodiment, $R^{11}$ is a carboxy group having from 1 to about 18 carbon atoms. Blocked mercaptosilanes are further described in U.S. Pat. Nos. 6,579,949 and 6,683,135, which are incorporated herein by reference.

Examples of blocked mercaptosilanes include 2-triethoxysilyl-1-ethyl thioacetate, 2-trimethoxysilyl-1-ethyl thioacetate, 2-(methyldimethoxysilyl)-1-ethyl thioacetate, 3-trimethoxysilyl-1-propyl thioacetate, triethoxysilylmethyl thioacetate, trimethoxysilylmethyl thioacetate, triisopropoxysilylmethyl thioacetate, methyldiethoxysilylmethyl thioacetate, methyldimethoxysilylmethyl thioacetate, methyldiisopropoxysilylmethyl thioacetate, dimethylethoxysilylmethyl thioacetate, dimethylmethoxysilylmethyl thioacetate, dimethylisopropoxysilylmethyl thioacetate, 2-triisopropoxysilyl-1-ethyl thioacetate, 2-(methyldiethoxysilyl)-1-ethyl thioacetate, 2-(methyldiisopropoxysilyl)-1-ethyl thioacetate, 2-(dimethylethoxysilyl)-1-ethyl thioacetate, 2-(dimethylmethoxysilyl)-1-ethyl thioacetate, 2-(dimethylisopropoxysilyl)-1-ethyl thioacetate, 3-triethoxysilyl-1-propyl thioacetate, 3-triisopropoxysilyl-1-propyl thioacetate, 3-methyldiethoxysilyl-1-propyl thioacetate, 3-methyldimethoxysilyl-1-propyl thioacetate, 3-methyldiisopropoxysilyl-1-propyl thioacetate, 1-(2-triethoxysilyl-1-ethyl)-4-thio acetylcyclohexane, 1-(2-triethoxysilyl-1-ethyl)-3-thioacetylcyclohexane, 2-triethoxysilyl-5-thioacetylnorbornene, 2-triethoxysilyl-4-thioacetylnorbornene, 2-(2-triethoxysilyl-1-ethyl)-5-thioacetylnorbornene, 2-(2-triethoxysilyl-1-ethyl)-4-thioacetylnorbornene, 1-(1-oxo-2-thio-5-triethoxysilylpenyl)benzoic acid, 6-triethoxysilyl-1-hexyl thioacetate, 1-triethoxysilyl-5-hexyl thioacetate, 8-triethoxysilyl-1-octyl thioacetate, 1-triethoxysilyl-7-octyl thioacetate, 6-triethoxysilyl-1-hexyl thioacetate, 1-triethoxysilyl-5-octyl thioacetate, 8-trimethoxysilyl-1-octyl thioacetate, 1-trimethoxysilyl-7-octyl thioacetate, 10-triethoxysilyl-1-decyl thioacetate, 1-triethoxysilyl-9-decyl thioacetate, 1-triethoxysilyl-2-butyl thioacetate, 1-triethoxysilyl-3-butyl thioacetate, 1-triethoxysilyl-3-methyl-2-butyl thioacetate, 1-triethoxysilyl-3-methyl-3-butyl thioacetate, 3-trimethoxysilyl-1-propyl thiooctanoate, 3-triethoxysilyl-1-propyl thiopalmitate, 3-triethoxysilyl-1-propyl thiooctanoate, 3-triethoxysilyl-1-propyl thiobenzoate, 3-triethoxysilyl-1-propyl thio-2-ethylhexanoate, 3-methyldiacetoxysilyl-1-propyl thioacetate, 3-triacetoxysilyl-1-propyl thioacetate, 2-methyldiacetoxysilyl-1-ethyl thioacetate, 2-triacetoxysilyl-1-ethyl thioacetate, 1-methyldiacetoxysilyl-1-ethyl thioacetate, 1-triacetoxysilyl-1-ethyl thioacetate, tris-(3-triethoxysilyl-1-propyl)trithiophosphate, bis-(3-triethoxysilyl-1-propyl)methyldithiophosphonate, bis-(3-triethoxysilyl-1-propyl)ethyldithiophosphonate, 3-triethoxysilyl-1-propyldimethylthiophosphinate, 3-triethoxysilyl-1-propyldiethylthiophosphinate, tris-(3-triethoxysilyl-1-propyl)tetrathiophosphate, bis-(3-triethoxysilyl-1-propyl)methyltrithiophosphonate, bis-(3-triethoxysilyl-1-propyl)ethyltrithiophosphonate, 3-triethoxysilyl-1-propyldimethyldithiophosphinate, 3-triethoxysilyl-1-propyldiethyldithiophosphinate, tris-(3-methyldimethoxysilyl-1-propyetrithiophosphate, bis-(3-methyldimethoxysilyl-1-propyl)methyldithiophosphonate, bis-(3-methyldimethoxysilyl-1-propyl)ethyldithiophosphonate, 3-methyldimethoxysilyl-1-propyldimethylthiophosphinate, 3-methyldimethoxysilyl-1-propyldiethylthiophosphinate, 3-triethoxysilyl-1-propylmethylthiosulphate, 3-triethoxysilyl-1-propylmethanethiosulphonate, 3-triethoxysilyl-1-propylethanethiosulphonate, 3-triethoxysilyl-1-propylbenzenethiosulphonate, 3-triethoxysilyl-1-propyltoluenethiosulphonate, 3-triethoxysilyl-1-propylnaphthalenethiosulphonate, 3-triethoxysilyl-1-propylxylenethiosulphonate, triethoxysilylmethylmethylthiosulphate, triethoxysilylmethylmethanethiosulphonate, triethoxysilylmethylethanethiosulphonate, triethoxysilylmethylbenzenethiosulphonate, triethoxysilylmethyltoluenethiosulphonate, triethoxysilylmethylnaphthalenethiosulphonate, and triethoxysilylmethylxylenethiosulphonate. Blocked mercaptosilanes are commercially available from GE Silicones-OSi Specialties as NXT® silanes. A useful blocked silane is Deolink MX (thiocarboxylsilane), manufactured by DOG-Chemie (Hamburg, Germany).

In one or more embodiments, blocked mercaptosilanes are used in conjunction with a deblocking agent. In certain embodiments, deblocking agents can function as a proton source and a blocking group acceptor. When reaction of the mixture to couple the filler to the polymer is desired, a deblocking agent is added to the mixture to deblock the blocked mercaptosilane. Deblocking agents, which are sometimes referred to as deprotection agents, include N,N'-diphenylguanidine, ethanolamines, ethyleneamines, ethylene glycol, polyethylene glycols, propylene glycol, polypropylene glycols, mixed ethylene-propylene glycols, alkyl-terminated glycols, glycerol, trimethylol alkanes, pentaerythritol, aniline, phenylene diamines, phenol, catechol, dihydroquinone, resorcinol, aminophenol, 1,3-diaminopropane, 1,4-diaminobutane, 1,5-diaminopentane, 1,6-diaminohexane, N-(3-aminopropyl)-1,3-propanediamine(3,3'-iminobispropylamine), 3-amino-1-propanol, imidazole, benzimidazole, aminobenzimidazole, pyrrole, indole, pyrazole, triazole, benzotriazole, and mixtures thereof. Deblocking is further described in U.S. Pat. Nos. 6,579,949 and 6,683,135, which are incorporated herein by reference.

In addition to the foregoing ingredients, the vulcanizable compositions of this invention may also optionally include processing oils, mica, calcium carbonate, homogenizing agents, flame retardants, zinc oxide, stearic acid, and mixtures thereof. Certain embodiments may be substantially devoid of any of these constituents.

Processing oils may be used in the present invention. Useful processing oils include paraffinic, naphthenic oils, and mixtures thereof. These oils may be halogenated as disclosed in U.S. Pat. No. 6,632,509, which is incorporated herein by reference. In one or more embodiments, useful processing oils are generally characterized by low sulfur content, low aromaticity, low volatility, and a flash point of more than about 550° F. In one or more embodiments, these processing oils may be referred to as white oils. In one or more embodiments, useful oils have a sulfur content of less than 0.5 weight percent, in other embodiments, less than 0.1 weight percent, in other embodiments less than 0.05 weight percent, and in other embodiments less than 0.01 weight percent sulfur. In one or more embodiments, useful oils have limited unsaturation. In particular embodiments, useful oils have an unsaturation level of less than 3%, in other embodiments less than 1%, in other embodiments less than 0.5%, and in other embodiments less than 0.1%. Useful oils are commercially available. A useful oil is available under the tradename FHR Ultra 1199.

Mica includes mixtures of sodium and potassium aluminum silicate. Mica can be defined by the chemical formula $\alpha\Delta2-3(\Omega)4O10(\Sigma)2$, where the $\alpha$ ion is potassium, sodium, barium, calcium, cesium, and/or ammonium, the $\Delta$ ion is aluminum, lithium, iron, zinc, chromium, vanadium, titanium, manganese, and/or magnesium, the $\Omega$ ion is silicon, aluminum, beryllium, boron, and/or iron (+3), and $\Sigma$ is oxygen, fluorine, or hydroxide ion. Micas include true micas, brittle micas, and interlayer-deficient micas. True micas include a majority of singularly charged ions (e.g., potassium and sodium) in the $\alpha$ position. Brittle micas include a majority of doubly charged ions (e.g., calcium or barium) in the $\alpha$ position. Interlayer-deficient micas include fewer cations in the interlayer (the layer between the tetrahedral-octahedral-tetrahedral layers of the crystalline structure) than true or brittle micas.

Examples of true micas include aluminoceladonite (potassium aluminum magnesium iron silicate hydroxide), boromuscovite (potassium boro-silicate hydroxide), celadonite (potassium iron magnesium silicate hydroxide), chromphyllite (potassium chromium aluminum silicate hydroxide fluoride), ferro-aluminoceladonite (potassium aluminum iron magnesium silicate hydroxide), ferroceladonite (potassium iron magnesium silicate hydroxide), muscovite (potassium aluminum silicate hydroxide), nanpingite (cesium aluminum silicate hydroxide), paragonite (sodium aluminum silicate hydroxide), roscoelite (potassium vanadium aluminum silicate hydroxide), tobelite (ammonium aluminum silicate hydroxide), annite (potassium iron aluminum silicate hydroxide), aspidolite (sodium magnesium aluminum silicate hydroxide), biotite (potassium magnesium iron aluminum silicate hydroxide fluoride), eastonite (potassium magnesium aluminum silicate hydroxide), ephesite (sodium lithium aluminum silicate hydroxide), hendricksite (potassium zinc aluminum silicate hydroxide), lepidolite (potassium lithium aluminum silicate fluoride hydroxide), masutomilite (potassium lithium aluminum manganese silicate fluoride), montdorite (potassium iron manganese magnesium aluminum silicate fluoride), norrishite (potassium lithium manganese silicate), polylithionite (potassium lithium aluminum silicate fluoride), phlogopite (potassium magnesium aluminum silicate hydroxide), preiswerkite (sodium magnesium aluminum silicate hydroxide), siderophyllite (potassium iron aluminum silicate hydroxide), tainiolite (potassium lithium magnesium silicate fluoride), tetra-ferri-annite (potassium iron silicate hydroxide), tetra-ferriphlogopite (potassium magnesium iron silicate hydroxide), trilithionite (potassium lithium aluminum silicate fluoride), zinnwaldite (potassium lithium iron aluminum silicate fluoride hydroxide), and mixtures thereof.

Examples of brittle micas include chernykhite (barium vanadium aluminum silicate hydroxide), margarite (calcium aluminum silicate hydroxide), anadite (barium potassium iron magnesium aluminum silicate hydroxide), bityite (calcium lithium aluminum beryllium silicate hydroxide), clintonite (calcium magnesium aluminum silicate hydroxide), kinoshitalite (barium magnesium aluminum silicate hydroxide), and mixtures thereof.

Examples of interlayer deficient micas include brammallite (sodium aluminum silicate hydroxide), glauconite (potassium sodium iron aluminum magnesium silicate hydroxide), illite (potassium aluminum silicate hydroxide), wonesite (sodium magnesium aluminum silicate hydroxide), and mixtures thereof.

Useful calcium carbonates include finely ground calcium carbonate. Commercially available forms are available from Harwick Chemical, J. M. Huber Corporation, Georgia Marble, Genstar Stone Products and Omya, Inc.

Useful homogenizing agents include those composed of a mixture of light colored resins having a specific gravity of about 1.0 g/cc at 23° C. and a softening point of about 100° C. One particularly suitable homogenizing agent is available in flake form from Struktol Corporation under the tradename Struktol® 60 NS.

Alumina trihydrates include finely divided, odorless, crystalline, white powders having the chemical formula $Al_2O_3 \cdot 3H_2O$. Alumina Trihydrate can be utilized in the present invention to enhance the green strength of the base polymer. Useful alumina trihydrates have an average particle size ranging from about 0.1 micron to about 5 microns, and more preferably, from about 0.5 micron to about 2.5 microns.

Alumina trihydrate is commercially available from Franklin Industrial Materials, of Dalton, Ga. Notably, alumina trihydrate can also be advantageously used separately as a flame retardant and smoke suppressant in the EPDM-based roofing membrane composition of the present invention.

Other sources of alumina trihydrate are available from J. M. Huber Corporation of Norcross, Ga. under the trademark Micral®. These alumina trihydrates have a median particle size of about 1.1 microns to about 1.5 microns, a specific gravity of about 2.42, an ash content of about 64-65 weight percent and a loss on ignition at 1000° F. of about 34.65 percent by weight.

Still another useful non-combustible mineral filler suitable for the present invention is the ore of calcium borate. This filler is available in various particle size grades from American Borate Company, Virginia Beach, Va., under the tradename Colemanite® and has the chemical formula $Ca_2B_6O_{11} \cdot 5H_2O$. Colemanite® has a specific gravity of about 2.4. Colemanite® may have an average particle size of about 0.1 to about 5 microns, or from about 0.5 to about 2.5 microns.

Yet another flame-retardant mineral filler which may be particularly suitable for use in the roofing membrane of the present invention is magnesium hydroxide. Useful magnesium hydroxides $(Mg(OH)_2)$ include finely divided, white powders that are extremely effective smoke suppressants as well as a flame-retardant additives.

In one or more embodiments, the polymeric membranes of this invention include at least about 20%, in other embodiments at least 25%, and in other embodiments at least about 30% by weight olefinic rubber based on the entire weight of the membrane. In one or more embodiments, the polymeric membranes of this invention include less than 100%, in other embodiments, less than 50%, and in other embodiments less than about 40% by weight olefinic rubber based on the entire weight of the membrane. It will be appreciated that by the term "membrane" as used throughout may refer to the entire membrane, in the case of a mono-layer membrane, or to the non-black layer of a multi-layered membrane.

In one or more embodiments, the total content of the fillers used in the production of the membranes are less than 250 parts by weight mineral filler per 100 parts by weight rubber. It will be understood that parts by weight of the component per 100 parts by weight of the rubber (e.g., elastomeric copolymer) can be referred to as phr. It will also be appreciated that reference to the level or amount of filler in the vulcanizable composition corresponds to the level or amount of filler in the non-black membrane or non-black layer or the membrane. In other embodiments less than 220 phr, in other embodiments less than 200 phr, and in other embodiments less than 180 phr filler may be included in the membranes. In one or more embodiments, the vulcanizable compositions (and non-black layers of the membranes) include more than 130 phr, in other embodiments more than 140 phr, and in other embodiments more than 150 phr of the filler. Inasmuch as the ingredients of the vulcanizable composition of matter are employed to make a non-black membrane (or layer thereof), the fillers employed are non-black.

In one or more embodiments, at least a threshold amount of the filler included in the vulcanizable composition is a non-black reinforcing filler. In one or more embodiments, at least 25% by weight, in other embodiments at least 35% by weight, in other embodiments at least 45% by weight of the filler is a non-black reinforcing filler.

In one or more embodiments, silica is employed as a reinforcing non-black filler. It will be appreciated that silica filler can provide the entire content of the fillers for the polymeric membrane. In one or more other embodiments, the filler content can include silica filler and titanium dioxide. In one or more other embodiments, the total filler content can include silica filler, titanium dioxide and talc. In one or more embodiments, titanium dioxide is considered non-reinforcing filler.

In one or more embodiments, the vulcanizable compositions include at least 15 phr, in other embodiments at least 20 phr, in other embodiments at least 20 phr, and in other embodiments at least 25 phr of silica filler. In one or more embodiments, the vulcanizable compositions may include less than 250 phr, in other embodiments, less than 200 phr, in other embodiments less than 90 phr, and in other embodiments less than 80 phr silica filler.

In one or more embodiments, the vulcanizable composition of this invention include at least 20 phr, in other embodiments at least 25 phr, in other embodiments at least 35 phr, in other embodiments at least 45 phr, and in other embodiments at least 55 phr titanium dioxide. In one or more embodiments, the vulcanizable composition may include less than 90 phr, in other embodiments less than 80 phr, in other embodiments less than 75 phr, in other embodiments less than 60 phr, and in other embodiments at least 65 phr titanium dioxide.

In one or more embodiments, the vulcanizable composition of this invention are devoid of talc. In one or more embodiments, the vulcanizable composition of this invention include at least 5 phr and in other embodiments at least 15 phr talc. In one or more embodiments, the vulcanizable composition may include less than 90 phr and in other embodiments less than 50 phr talc.

In certain embodiments, the vulcanizable composition is devoid of mica. In other embodiments, the vulcanizable composition of the invention may include at least 6 phr and in other embodiments at least 12 phr mica. In one or more embodiments, the vulcanizable composition may include less than 25 phr and in other embodiments less than 12 phr mica.

In certain embodiments, the vulcanizable composition includes limited clay. In particular embodiments, the vulcanizable composition is devoid of clay. In one or more embodiments, the vulcanizable composition includes less than 15 phr, in other embodiments less than 10 phr, in other embodiments less than 5 phr, and in other embodiments less than 1 phr clay.

In certain embodiments, the vulcanizable composition is devoid of calcium carbonate. In other embodiments, the vulcanizable compositions of the invention may include at least 3 phr and in other embodiments at least 5 phr calcium carbonate. In one or more embodiments the vulcanizable composition may include less than 200 phr and in other embodiments less than 20 phr calcium carbonate.

In one or more embodiments, the vulcanizable composition includes from about 0.1 phr to about 5 phr, silane coupling agent. In other embodiments the composition may include at least 0.1 phr, in other embodiments at least 0.3 phr, in other embodiments at least 0.5 phr, in other embodiments at least 0.7 phr, in other embodiments at least 1 phr, and in other embodiments at least 1.5 phr silane coupling agent. In one or more embodiments the composition may include less than 5 phr, in other embodiments less than 3 phr, in other embodiments less than 2.5 phr, in other embodiments less than 2.0 phr, in other embodiments less than 1.8 phr, and in other embodiments less than 1.5 phr silane coupling agent. It should be appreciated that reference to silane coupling agent refers to the active constituents or portion of any blend or masterbatch including a silane coupling agent. For example, one can employ a coupling agent that is included in a blend with an inert carrier (such as an olefin wax). The activity (i.e. the % of the mixture that includes the silane coupling agent) may vary, but those skilled in the art will be able to readily determine the appropriate amount in view of this disclosure and the activity of the mixture.

In one or more embodiments, the polymeric membranes of this invention include at least 30 phr, in other embodiments at least 40 phr, and in other embodiments at least 50 phr processing oil. In one or more embodiments, the membrane of the invention may include less than 120 phr, and in other embodiments less than 100 phr, and in other embodiments less than 50 phr processing oil.

In one or more embodiments, the membranes of this invention includes from about 2 to about 10 phr homogenizing agent. In other embodiments, the membrane includes less than 5 phr homogenizing agent, and in other embodiments less than 3 phr homogenizing agent. In certain embodiments, the vulcanizable composition is devoid of a homogenizing agent.

In one or more embodiments, the vulcanizable composition of this invention includes from about 10 to about 65 phr flame retardant package. In other embodiments, the vulcanizable composition includes less than 10 phr flame retardant package, and in other embodiments less than 5 phr flame retardant package. In certain embodiments, the vulcanizable composition is devoid of a flame retardant package.

The roofing membrane of the present invention can be prepared by conventional means using conventional rubber compounding equipment such as Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils, waxes and other ingredients used. In one or more embodiments, the ingredients can be added together in a single shot. In other embodiments, some of the ingredients such as fillers, oils, etc. can first be loaded followed by the polymer. In other embodiments, a more conventional manner can be employed where the polymer is added first followed by the other ingredients.

Mixing times generally range from about 2 to 6 minutes. In certain embodiments an incremental procedure can be used whereby the base polymer and part of the fillers are added first with little or no process oil, the remaining fillers and process oil are added in additional increments. In other embodiments, part of the EPDM can be added on top of the fillers, plasticizers, etc. This procedure can be further modified by withholding part of the process oil, and then adding it later. In one or more embodiments, two-stage mixing can be employed.

The sulfur cure package (sulfur/accelerator) can be added near the end of the mixing cycle and at lower temperatures to prevent premature crosslinking of the EPDM polymer chains. When utilizing a type B Banbury internal mixer, the dry or powdery materials such as non-black mineral fillers (i.e., untreated clay, treated clays, talc, mica, and the like) can be added first, followed by the liquid process oil and finally the polymer (this type of mixing can be referred to as an upside-down mixing technique).

The silica coupling agent can be added with the fillers near the beginning of the mixing cycle. In one or more embodiments, the silane coupling agent is included before the sulfur cure package is added.

Once mixed, the rubber composition can then be formed into a sheet via calendering. The compositions of the invention can also be formed into various types of articles using other techniques such as extrusion.

The resultant rubbery compositions may be prepared in sheet form in any known manner such as by calendering or extrusion. The cured sheets may also be cut to the desired dimensions. In one or more embodiments, the resulting admixture can be sheeted to thicknesses ranging from 5 to 200 mils, in other embodiments from 35 to 90 mils, by using conventional sheeting methods, for example, milling, calendering or extrusion. In one or more embodiments, the non-black admixture is sheeted to the desired thickness and then bonded to a black sheeting material having essentially the same characteristics as the non-black sheeting material of the present invention using conventional processing techniques. Typically, the plies are calendered separately and then laminated together in an uncured state, to be dusted and cured in an autoclave or by other means. The sheeting can be visually inspected and cut to the desired length and width dimensions after curing.

The calendered sheeting itself should show good, uniform release from the upper and lower calender rolls and have a smooth surface appearance (substantially free of bubbles, voids, fish eyes, tear drops, etc.). It should also have uniform release from the suction (vacuum) cups at the splicing table and uniform surface dusting at the dust box.

As is known in the art, the uncured polymeric sheets (which may also be referred to as uncured sheets) can be subjected to heat in order to effect vulcanization of the rubber. It is believed that this step of heating promotes the formation of chemical crosslinks between the EPDM polymer and the silica filler. As is known in the art, the dusted sheets are wound onto a metal curing mandrel and placed into an autoclave for curing.

In one or more embodiments, the rubber formulations disclosed herein for fabricating membranes are employed in the manufacture of bilaminate membranes wherein the non-black rubber formulations are employed to produce at least one layer of the laminate membranes. In particular embodiments, the non-black formulations disclosed herein are employed to prepare a first layer, and the second layer can derive from a distinct rubber formulation. In one or more embodiments, the distinct rubber formulation (i.e. the rubber formulation employed to prepare the second layer) includes carbon black. Rubber formulations that include elastomeric copolymer and carbon black are generally known in the art as disclosed in U.S. Pat. Nos. 6,632,509, 6,615,892, 5,700,538, 5,703,154, 5,804,661, 5,854,327, 5,093,206, and 5,468,550 which are incorporated herein by reference. For example, these black formulations may include elastomeric olefinic copolymer (i.e. rubber), from about 30 to about 160 parts by weight carbon black per 100 parts by weight rubber, 40 to 100 parts by weight oil per 100 parts by weight rubber, and other ingredients such as a cure package, antioxidants, cure activators, and the like. As is known in the art, the carbon black can be replaced or supplemented with other non-black fillers such as clay and talc.

In one or more embodiments, the laminate membranes of the present invention are bilaminates wherein each layer of the membrane accounts for about 50% of the total thickness of the membrane. For example, a 60 mil membrane may include a 30 mil first non-black layer and a 30 mil second carbon black-filled layer. In other embodiments, the thickness of the layers can be different. In fact, it may be advantageous to construct a membrane with a non-black layer that is thinner than the carbon black-filled layer. In one or more embodiments, the thickness of the non-black layer to the carbon black-filled layer may be about 1:3 to about 1:1, in other embodiments from about 1:2.5 to about 1:1.5, or in other embodiments from about 1:2 to about 1:1.8.

The membranes of the present invention can be optionally reinforced with a scrim fabric. In other embodiments, the membranes are devoid of scrim fabric.

The roof sheeting membranes can be evaluated for physical properties using test methods developed for mechanical rubber goods. Typical properties include, among others, tensile strength, modulus, ultimate elongation, tear resistance, ozone resistance, water absorption, dimensional stability, burn resistivity, and cured compound hardness.

The membranes of this invention can be used as follows. The non-black layer can face upward so as to reflect sunlight, and the black layer should face downward toward the building. As the sheet is unrolled over the roof substructure in a conventional fashion, field seams are prepared by overlapping the edges of a rubber sheet with the edges of an adjacent rubber sheet. The width of the seam can vary depending on the requirements specified by the architect, building contractor, or roofing contractor and thus, do not constitute a limitation of the present invention. Seams can be joined with conventional adhesives such as, for instance, a butyl-based lap splice adhesive, which is commercially available from Firestone Building Products Company as SA-1065. Application can be facilitated by spray, brush, swab or other means known in the art.

Also, field seams can be formed by using a seam tape and a companion primer such as QuickSeam™ tape and Quick Prime Plus™ primer, both of which are commercially available from Firestone Building Products Company of Indianapolis, Ind.

Thus it should be evident that the sheeting material and method of the present invention are highly effective in covering the roof of a building. The invention is particularly suited for use on roofs of buildings, but is not necessarily limited thereto. The sheeting material of the present invention can be used separately with other equipment, methods and the like, such as, for example, for linings for fish ponds, decorative and aquatic gardens, ponds on golf courses, and the like.

In order to demonstrate the practice of the present invention, the following examples have been prepared and tested. The examples should not, however, be viewed as limiting the scope of the invention. Accordingly, for an appreciation of the true scope and breadth of the invention, reference should be made to the following claims.

EXAMPLES

Samples 1-3

The following examples are submitted for the purpose of further illustrating the nature of the present invention and are not to be considered as a limitation of the scope thereof. The parts of each compounding ingredient are shown as parts per 100 parts elastomeric olefinic terpolymer.

Three non-black rubber roofing membrane compounds were prepared according to the recipe in Table I. The compounds were prepared by the compounding of the elastomers, fillers, processing materials, and other additives in a Brabender internal mixer, and resheeted to the desired dimensions using a 88° C. two-roll laboratory mill as described hereinabove.

TABLE I

| Sample Nos | 1 Masterbatch | 2 | 3 |
|---|---|---|---|
| EPDM polymer | 100 | 100 | 100 |
| Silica | 51.20 | 51.20 | 51.20 |
| Titanium dioxide | 58.20 | 58.20 | 58.20 |
| Mistron Vapor Talc | 40.60 | 40.60 | 40.60 |
| Process Oil (clear) | 59.42 | 59.42 | 59.42 |
| Blocked Mercaptosilane (50% active) | | | 2.3 |
| Unblocked Mercaptosilane (100% active) | | 1.15 | |
| Carbowax 3350 | 1.99 | 1.99 | 1.99 |
| Aflux PE 12 | 5.01 | 5.01 | 5.01 |
| Zinc oxide | 5.01 | 5.01 | 5.01 |
| Stearic Acid | 2.50 | 2.50 | 2.50 |
| Final Mix | 323.93 | 325.08 | 326.23 |
| Sulfur | 0.97 | 0.97 | 0.97 |
| Zinc DBDC (Butazate) | 1.46 | 1.46 | 1.46 |
| MBTS | 0.30 | 0.30 | 0.30 |
| Stearic Acid | 0.75 | 0.75 | 0.75 |
| Total PHR | 327.41 | 328.56 | 329.71 |

The various physical properties tested are reported in Table II.

TABLE II

| Compound Nos. | 1 | 2 | 3 |
|---|---|---|---|
| Mooney Viscosity, Mu | 31 | 33 | 27 |
| Scorch time t5, minute | 20 | 8 | 19 |
| 100% Modulus, psi | 207 | 302 | 285 |
| 300% Modulus, psi | 337 | 633 | 549 |
| Tensile strength, psi | 1535 | 2445 | 2177 |
| Elongation at break, % | 714 | 698 | 706 |
| Die C tear, lb/in | 149 | 192 | 177 |

For testing purposes, uncured compounds were tested in a MDR 2000 machine for their processing properties. The uncured compounds were cured using an electric heated curing press for 45 minutes at 160° C. Cured rubber slabs were die-cut and tested according to ASTM D4637. Mechanical properties were conducted according to ASTM D411.

Samples 4-13

Ten additional non-black rubber roofing membrane compounds were prepared in accordance with the procedure set forth in Samples 1-3 using the recipes set forth in Table III. The results of testing performed on the compounds or cured sheet thereof are set forth in Table IV.

TABLE III

| Sample Nos. | 4 | 5 | 6 | 7 | 8 | 9 | 10 | 11 | 12 | 13 |
|---|---|---|---|---|---|---|---|---|---|---|
| Ingredients | | | | | | | | | | |
| EPDM | 51.2 | 51.2 | 51.2 | 51.2 | 51.2 | 51.2 | — | — | — | — |
| Silica | | | | | | | | | | |
| UltraSid VN2 GR | — | — | — | — | — | — | 51.20 | 51.20 | 51.20 | |
| VP Coupsil 64111 | — | — | — | — | — | — | — | — | — | 51.20 |
| TiO2 | 58.20 | 58.20 | 58.20 | 58.20 | 58.20 | 58.20 | 58.20 | 58.20 | 58.20 | 58.20 |
| Talc | 40.60 | 40.60 | 40.60 | 40.60 | 40.60 | 40.60 | 40.60 | 40.60 | 40.60 | 40.60 |
| White Oil | 59.42 | 59.42 | 59.42 | 59.42 | 59.42 | 59.42 | 59.42 | 59.42 | 59.42 | 59.42 |

TABLE III-continued

| Sample Nos. | 4 | 5 | 6 | 7 | 8 | 9 | 10 | 11 | 12 | 13 |
|---|---|---|---|---|---|---|---|---|---|---|
| Coupling Agent | | | | | | | | | | |
| Deolink MX Silane (50% active) | — | 2.00 | — | — | — | — | — | — | — | — |
| Silquest A189 Silane (liquid) | — | — | 1.00 | — | — | — | — | — | — | — |
| Si-69 (clear liquid) | — | — | — | 1.00 | — | — | — | — | — | — |
| Si-264 (light yellow liquid) | — | — | — | — | 1.00 | — | — | — | — | — |
| NXT Z 45 (clear liquid) | — | — | — | — | — | 1.00 | — | 1.00 | — | — |
| Paraffinic Wax | 1.99 | 1.99 | 1.99 | 1.99 | 1.99 | 1.99 | 1.99 | 1.99 | 1.99 | 1.99 |
| PE Wax | 5.01 | 5.01 | 5.01 | 5.01 | 5.01 | 5.01 | 5.01 | 5.01 | 5.01 | 5.01 |
| Stearic Acid | 2.50 | 2.50 | 2.50 | 2.50 | 2.50 | 2.50 | 2.50 | 2.50 | 2.50 | 2.50 |
| Sulfur | 0.97 | 0.97 | 0.97 | 0.97 | 0.97 | 0.97 | 0.97 | 0.97 | 0.97 | 0.97 |
| Zinc DBDC (Butazate) | 1.46 | 1.46 | 1.46 | 1.46 | 1.46 | 1.46 | 1.46 | 1.46 | 1.46 | 1.46 |
| MBTS | 0.30 | 0.30 | 0.30 | 0.30 | 0.30 | 0.30 | 0.30 | 0.30 | 0.30 | 0.30 |
| Stearic Acid | 0.75 | 0.75 | 0.75 | 0.75 | 0.75 | 0.75 | 0.75 | 0.75 | 0.75 | 0.75 |
| Final Batch Total | 327.41 | 329.41 | 328.41 | 328.41 | 328.41 | 328.41 | 327.41 | 325.41 | 329.41 | 327.41 |

TABLE IV

| Sample Nos | 4 | 5 | 6 | 7 | 8 | 9 | 10 | 11 | 12 | 13 |
|---|---|---|---|---|---|---|---|---|---|---|
| Mooney Scorch | PW | MX | A189 | 69 | 264 | NXT | PW | NXT | MX | PW |
| Minimum Viscosity | 33.70 | 29.60 | 34.00 | 30.70 | 31.40 | 31.50 | 33.70 | 31.10 | 29.30 | 26.50 |
| T5 Minutes | 12.85 | 11.13 | 7.11 | 9.54 | 8.43 | 6.35 | 16.31 | 6.71 | 12.60 | 5.83 |
| T35 Minutes | 18.87 | 16.39 | 17.75 | 16.67 | 15.44 | 12.03 | 22.87 | 11.82 | 18.05 | 9.19 |
| ASTM D412 Tensile Unaged | | | | | | | | | | |
| 100% Modulus, psi | 192.5 | 252.2 | 274.6 | 259.5 | 286.8 | 278.9 | 207.7 | 287.8 | 277.9 | 327.0 |
| 200% Modulus, psi | 250.6 | 350.5 | 401.0 | 379.1 | 412.5 | 402.5 | 263.9 | 402.0 | 379.2 | 490.8 |
| 300% Modulus, psi | 313.0 | 453.3 | 531.6 | 496.2 | 542.7 | 539.8 | 321.1 | 528.8 | 489.8 | 677.6 |
| 500% Modulus, psi | 537.1 | 789.7 | 935.8 | 884.1 | 956.8 | 986.6 | 544.6 | 980.3 | 872.7 | 1323.1 |
| Tensile Strength, psi | 1773.6 | 2172.5 | 2251.8 | 2181.4 | 2196.5 | 2275.9 | 1729.6 | 2129.6 | 1867.4 | 2095.3 |
| Elongation (%) | 930.0 | 904.0 | 861.0 | 854.0 | 846.0 | 825.0 | 948.0 | 786.0 | 786.0 | 669.0 |
| Total Sample Rupture | None | All | All | All | All | All | None | All | All | All |
| ASTM D412 Tensile Aged 7 Days @ 240° F. | | | | | | | | | | |
| 100% Modulus, psi | 378.8 | 438.2 | 434.6 | 469.8 | 457.0 | 432.7 | 390.1 | 442.0 | 438.0 | 438.7 |
| 200% Modulus, psi | 543.9 | 654.9 | 678.6 | 721.0 | 691.8 | 653.8 | 542.8 | 660.3 | 635.7 | 673.9 |
| 300% Modulus, psi | 718.2 | 912.7 | 964.0 | 1004.1 | 967.2 | 924.0 | 709.5 | 934.3 | 879.6 | 967.1 |
| 500% Modulus, psi | 1393.0 | 1895.4 | 2008.1 | 2054.6 | 1992.9 | 1926.5 | 1384.4 | 1937.6 | 1747.6 | 1969.5 |
| Tensile Strength, psi | 2218.9 | 2373.5 | 2462.3 | 2189.5 | 2334.2 | 2189.3 | 1944.8 | 2214.0 | 1835.7 | 1887.7 |
| Elongation (%) | 646.0 | 563.0 | 562.0 | 519.0 | 551.0 | 539.0 | 605.0 | 545.0 | 514.0 | 481.0 |
| Total Sample Rupture | All | All | All | All | All | All | All | All | All | All |

Various modifications and alterations that do not depart from the scope and spirit of this invention will become apparent to those skilled in the art. This invention is not to be duly limited to the illustrative embodiments set forth herein.

What is claimed is:

1. A process for preparing a roofing membrane, the method comprising:
   i. mixing ethylene-propylene-diene rubber, silica, and a coupling agent defined by the formula:

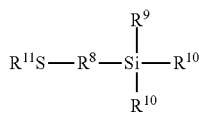

where $R^8$ is a divalent organic group or a bond, $R^9$ is a halogen atom or an alkoxy group, and each $R^{10}$ is independently a halogen, an alkoxy group, or a monovalent organic group, and where $R^{11}$ is a blocking group to form a mixture, where the mixture is devoid of carbon black;
   ii. adding a curative to the mixture to form a vulcanizable rubber composition;
   iii. fabricating the vulcanizable composition into an uncured sheet; and
   iv. curing the uncured sheet.

2. The process of claim 1, further comprising the step of introducing ethylene-propylene-diene rubber with a coupling agent, where the coupling agent is dispersed in a carrier.

3. The process of claim 1, where the curative is sulfur or a sulfur-containing compound.

4. The process of claim 3, further comprising the step of adding a cure accelerator.

5. The process of claim 1, where the coupling agent is a thioester, a thiophosphinate, a thiophosphate, or a thiosulphonate.

6. The process of claim 1, where the mixture includes at least 30 and less than 120 parts by weight processing oil per 100 parts by weight rubber.

7. The process of claim 6, where the processing oil has a sulfur content of less than 0.5 weight percent and an unsaturation level of less than 3%.

8. The process of claim 1, where the vulcanizable composition includes:
   i. an ethylene-propylene-diene rubber;
   ii. from about 20 to about 250 parts by weight of a silica filler per 100 parts by weight rubber; and iii. from about 0.1 to about 5 parts by weight of a silane coupling agent per 100 parts by weight rubber; wherein the silane coupling agent is compatible with both the ethylene-propylene-diene rubber and the silica filler such that the ethylene-propylene-diene rubber is chemically coupled to the silica filler.

* * * * *